March 28, 1939.　　　A. Y. DODGE　　　2,152,305
LUBRICATING DEVICE
Filed Aug. 13, 1936　　2 Sheets-Sheet 2
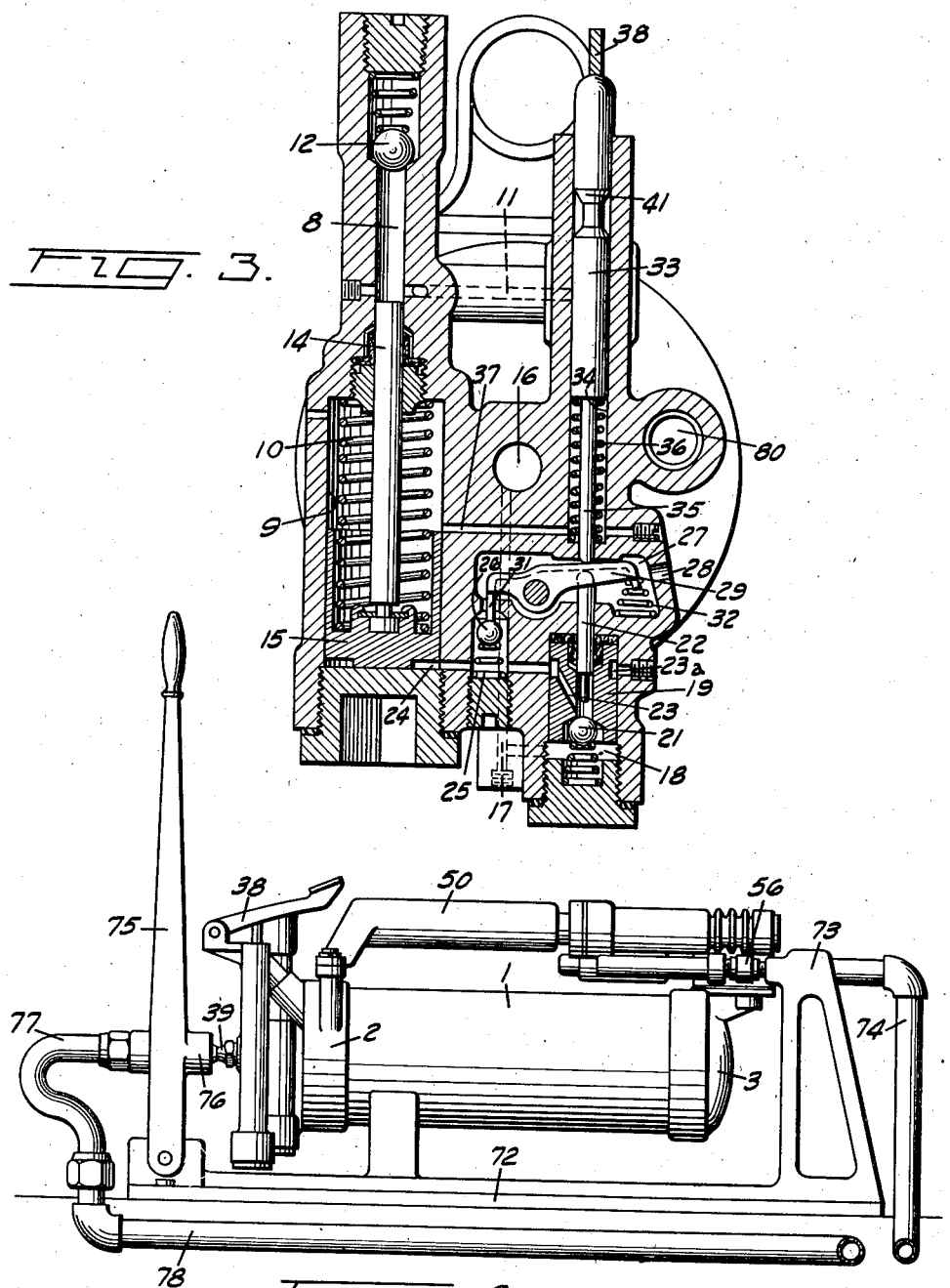
INVENTOR.
ADIEL Y. DODGE
BY
McConkey & Booth
ATTORNEYS.

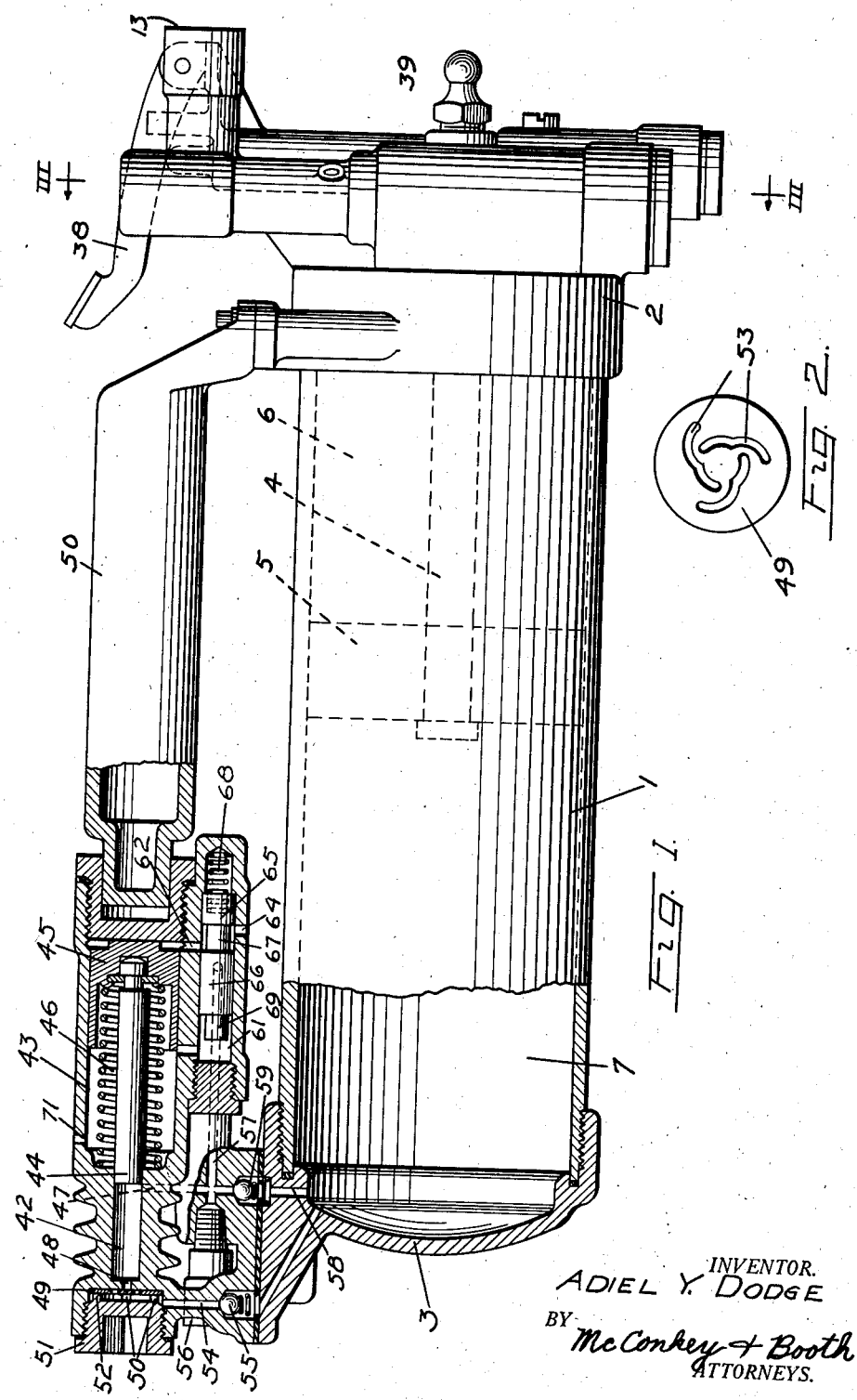

Patented Mar. 28, 1939

2,152,305

UNITED STATES PATENT OFFICE 2,152,305

LUBRICATING DEVICE

Adiel Y. Dodge, South Bend, Ind., assignor to The Lubrication Corporation, Chicago, Ill., a corporation of Delaware Application August 13, 1936, Serial No. 95,752

10 Claims. (Cl. 221—47.3)

This invention relates to portable power devices and more particularly to portable power-operated lubricant dispensers and to charging means therefor.

Portable power devices such as lubricant dispensers and the like have been proposed connected to a source of power such as a source of compressed air or electricity by conduits or the like. Such conduits limit the portability by limiting the distance through which the devices may be moved and otherwise interfering with the free handling thereof. Accordingly one of the objects of the present invention is to provide a portable power device such as a lubricant dispenser which does not require a permanent connection to a source of power and which is consequently freely portable.

Another object of the invention is to provide a portable power device in which fluid under pressure may be stored.

Another object of the invention is to provide a portable power device in which the pressure of the stored fluid may be increased to increase the capacity of the device.

Another object is to provide a fluid pressure booster in combination with a fluid operated device such as a lubricant pump to increase the pressure obtainable by the pump.

Another object is to provide a charging device for charging a lubricant dispenser with lubricant and compressed operating fluid quickly and easily.

Other objects, advantages and novel features will be apparent from the following description when read in connection with the accompanying drawings, in which:

Figure 1 is a side view with parts in section of a lubricant dispenser embodying the invention;

Figure 2 is a detail view of the pressure booster check valve;

Figure 3 is a section on the line III—III of Figure 1; and

Figure 4 is a side view of a charging device with a dispenser in place thereon.

The dispenser shown in Figures 1 to 3 comprises a cylindrical lubricant reservoir 1 having one of its ends closed by a head 2 and its opposite end closed by a cap 3. A tube 4 projects from the head 2 into the reservoir and slidably carries a piston 5 which divides the reservoir into a lubricant chamber 6 and an air chamber 7.

The head 2 is formed with a lubricant pump cylinder 8 and a co-axial fluid motor cylinder 9. Lubricant is admitted into the cylinder 8 through a passage 11 communicating with the lower portion of the cylinder and is discharged therefrom past a check valve 12 through a suitable outlet opening 13. A piston 14 is slidably mounted in the cylinder 8 and projects into the cylinder 9 where it is connected to a piston 15, a coil spring 10 preferably being provided for urging the pistons 14 and 15 to the position shown in Figure 3.

The tube 4 communicates with an opening 16 in the head 2 and a passage 17 leads from the opening 16 into the lower portion of a valve chamber 18. A valve block 19 is mounted in the valve chamber 18 and provides, at its lower end, a valve seat for a spring-pressed check valve 21. Above the valve 21 the block 19 is provided with an axial bore slidably receiving a valve rod 22 and a diagonal bore 23 communicating with a circumferential groove 23a, by means of which communication is established with a cross-bore 24 which opens into the lower part of the cylinder 9. The bore 24 communicates with a valve chamber 25 which contains a spring-pressed check valve 26 controlling communication with a chamber 27 having an atmospheric vent 28.

A lever 29 is pivoted intermediate its ends in the chamber 27 and one end of the lever is formed with a projecting finger 31 adapted to engage and open the check valve 26. At the opposite side of its pivot the lever 29 bears on the end of the rod 22 and a compression spring 32 is provided to urge the lever 29 in a direction to open the valve 26 as shown in Figure 3.

The lever 29 is controlled by means of a plunger 33 which is slidably mounted in a cylinder 34 formed in the head 2. The plunger 33 has a reduced extension 35 at one end projecting into the chamber 27 and engaging the lever 29, the opposite end of the plunger projecting outwardly from the head 2. A coil spring 36 is preferably provided to urge the plunger 33 upwardly and a bore 37 connects the lower portion of the cylinder 34 with the central portion of the cylinder 9. A lever 38 pivoted at one end engages the upper end of the plunger 33 and may be operated manually to control the position of the plunger.

A lubricant fitting 39 shown as being of the type having a spherical head portion is connected to the head 2 and communicates with the lubricant chamber 6 to supply lubricant thereto through passage 80. If desired, communication between the lubricant reservoir 6 and the passage 11 leading to the cylinder 8 may be controlled by a valve, not shown, which is operated by a cam portion 41 on the plunger 33. When the plunger is raised into the position shown in Figure 3 such a valve would be closed and would be opened by depression of the plunger 33 to establish communication between the lubricant chamber 6 and the passage 11.

Assuming that the lubricant chamber 6 contains a charge of lubricant and that the air chamber 7 contains a charge of compressed air or the like, the device may be operated by depressing the lever 38 to move the plunger 33 downwardly in the cylinder 34. This motion rocks the lever 29 about its pivot, raising finger 31 and moving the rod 22 downwardly into engagement with the valve 21. It will be noted that lost motion is provided between the rod 22 and valve 21 so that the first motion of the plunger 33 will not cause the valve 21 to open. This first motion will, however, permit closure of valve 26 and will also move the cam portion 41 sufficiently to open the valve between the lubricant chamber 6 and the passage 11 so that lubricant may flow into the cylinder 8 under the influence of pressure exerted on the piston 5. If this pressure is sufficient to force lubricant past the check valve 12 and through the outlet 13 to the point to be lubricated, no further depression of the lever 38 is necessary.

However, if a higher pressure is necessary or desirable the lever 38 may be depressed further to open the valve 21, the valve 26 having previously closed as described, under the influence of its spring. At this time air will flow from the air chamber 7 through the tube 4 and passages 16 and 17 past the valve 21 and through the passages 23, 23a and 24 into the cylinder 9 below the piston 15. The piston 15 will, therefore, be moved upwardly under the influence of the air pressure to move the piston 14 in the cylinder 8 and displace lubricant therein under high pressure.

When the piston 15 has moved upwardly in the cylinder 9 far enough so that its lower edge passes the passage 37, air under pressure will flow through the passage 37 into the cylinder 34 and urge the plunger 33 upwardly therein. This action will create a force on the lever 38 tending to raise it against the manual force applied by the operator and if it is sufficient to overcome the manually-applied force the plunger 33 will move upwardly into the position of Figure 3. At this time the valve 21 will close under the influence of its spring and of air pressure exerted on the lower side thereof and the valve 26 will be opened by the projection 31 on the lever 29. Air in the cylinder 9 will, therefore, be exhausted to atmosphere through the passage 24 and valve chamber 25 past the valve 26 and through the vent 28 to atmosphere. The pistons 14 and 15 will be retracted under the influence of the spring 10 and the parts will be returned to the position of Figure 3 in which they are ready for another operation.

If it is desired to operate the device to produce a single pump stroke the operator may exert sufficient pressure on the lever 38 to prevent return thereof and of the plunger 33 under the influence of air pressure acting on the lower end of the plunger. In this case the valves will not return to the position of Figure 3 as described above until after pressure on the lever 38 has been relieved and only a single pump discharge or lubricant "shot" will be delivered. It will be apparent that by exerting a constant force less than that required to hold the plunger 33 down against air pressure acting on the lower end thereof a semi-automatic operation may be produced.

While the dispenser as described so far may be operated satisfactorily if the air chamber 7 is charged with air under pressure from the usual service station outlet or the like, it will be apparent that a higher lubricant pressure may be obtained and that the air storage capacity of the dispenser may be materially increased without increasing the size thereof if air is stored therein under a higher pressure. According to the present invention the dispenser includes an air booster for producing such higher pressure with the consequent advantages thereof. As shown, the booster comprises a high pressure cylinder 42 and a co-axial low pressure cylinder 43. A piston 44 is slidably mounted in the cylinder 42 and extends into the cylinder 43 where it is connected to a piston 45, a spring 46 being provided to urge the pistons to their intake position as shown in Figure 1. The cylinders 42 and 43 are preferably arranged parallel to and overlying the reservoir 1 and a handle 50 may be connected at one end to the cylinder 43 and at its opposite end to the head 2.

The high pressure cylinder is provided with an air inlet passage 47 and an axial outlet opening 48. The outlet opening 48 is controlled by a check valve disc 49 held in place by a screw threaded plug 51 having an annular flange 52 for engaging the disc 49 intermediate its edges. As best shown in Figure 2, the disc 49 has a solid central portion and is provided with a plurality of arcuate slots 53 leading from a point adjacent said central portion to adjacent the edge thereof. When the parts are assembled as shown in Figure 1 the annular flange 52 engages the disc 49 near its periphery and holds it against the walls of the outlet opening 48 to close the same. It will be noted that an annular space is left around the flange 52 between the body of the plug 51 and the disc 49 and a passage 54 communicates with such annular space and with the air chamber 7, the flange 52 being provided with notches 50 to permit communication between the space enclosed by the flange 52 and the annular space around it. A second check valve 55 is preferably provided to prevent return flow through the passage 54.

Air is supplied through a valved fitting 56 which may be formed for engagement with the usual air dispensing nozzle and which communicates with a passage 57. The passage 57 is in communication with the passage 47 and is also connected directly to the air chamber 7 by a passage 58 controlled by a spring-pressed check valve 59. The passage 57 opens into the central portion of a cylindrical valve chamber 61 which is connected by a passage 62 to one end of the cylinder 43 and by a passage 63 with the central portion of the cylinder 43. An exhaust port 64 establishes communication between the valve chamber 61 and atmosphere.

A valve having enlarged portions 65 and 66 connected by a reduced portion 67 is slidably mounted in the valve chamber 61 and is urged toward one end thereof by a spring 68, a reduced projection 69 preferably being provided on one end of the valve to limit movement thereof in the valve chamber.

In Figure 1 the parts are shown in the position they will occupy at the end of a return stroke of the pistons 44 and 45. In this position the ports 62 and 64 are in communication around the reduced portion 67 of the valve and the passage 57 is closed by the enlarged portion 66 of the valve. The end of the valve chamber is open to atmosphere through the passage 63 and the cylinder 43 and an atmospheric vent 71 in the end of the cylinder 43. The spring 68 is, therefore, free to shift the valve to the left in the valve chamber until the projection 69 engages the end of the valve chamber and limits further movement. When the valve is so shifted the exhaust port 64 will be closed by the portion 65 of the valve and the passages 57 and 62 will be in communication around the reduced portion 67 of the valve.

If the inlet nipple 56 is connected to a source of compressed air, air will flow through the passage 57 and past check valve 59 through passage 58 directly into the air chamber 7. When the pressure in the air chamber 7 reaches that of the source to which the nipple 56 is connected the check valve 59 will close under the influence of its spring thereby preventing return flow of air through the passage 58. Air flowing through the passage 57 will also flow through the passage 47 into the cylinder 42 and around the portion 67 of the valve through the port 62 into the cylinder 43. Since the piston 45 is larger than the piston 44, the pistons will be urged to the left as seen in Figure 1, thereby discharging air from the cylinder 42 under high pressure. At this time the disc 49 will spring outwardly permitting air to flow through the notches 50 around the flange 52 and through the passage 54 past the check valve 55 into the air chamber 7. It will be appreciated that due to the difference in size of the pistons 44 and 45, a pressure may be developed which is substantially in excess of that supplied to the nipple 56. For example, assuming that the piston 45 has an area ten times that of the piston 44 and that air under a pressure of one hundred pounds per square inch is supplied to the nipple 56, a pressure of substantially one thousand pounds per square inch may be developed in the passage 54 and air chamber 7.

When the pistons 44 and 45 have traveled to the left far enough so that the rear edge of the piston 45 passes the port 63, air under pressure will be admitted to the end of the valve to urge it to the position shown in Figure 1. At this time the ports 62 and 64 will be in communication and the air behind the piston 45 will be exhausted to atmosphere, thus permitting the spring 46 to urge pistons 44 and 45 back to the position shown in Figure 1. As soon as the pistons reach this position, the valve chamber will be connected to atmosphere through the port 63 and 71 as described above and the valve may again move to the left under the influence of the spring 68. As long as air pressure is supplied to the nipple 56, this operation will continue automatically until the maximum pressure for which the pump is designed has been built up in the air chamber 7.

Figure 4 illustrates a charging device for a dispenser of the type described above which comprises a base 72 having a fixed bracket 73 at one end thereof. The bracket 73 carries an air nozzle adapted to cooperate with the air nipple 56, the nozzle being connected through a pipe 74 to a suitable source of air under pressure. At the opposite end of the base 72, a lever 75 is pivoted and carries a grease dispensing nozzle 76 having a concave spherical surface for engagement with the head of the grease nipple 39. The nozzle 76 is connected through a flexible conduit 77 with a pipe 78 leading to a source of lubricant under pressure.

In order to charge a dispenser with lubricant and air, it is placed in the charging device with the air nipple 56 thereof registering with the air nozzle carried by the bracket 73. The lever 75 may then be swung about its pivot to force the nozzle 76 into engagement with the nipple 39, pressure on the lever 75 holding both of the nozzles and nipples firmly in engagement. If desired, both the air and grease nozzles may be supplied with automatically-operated valves which will open when pressure is applied thereto as described above, or manually-operable valves may be provided which will be opened manually after the dispenser is in place on the charging device. As soon as the valves are opened, lubricant will flow through the pipe 78 and conduit 77 into the nipple 39 and the lubricant chamber 36, thereby forcing the piston 5 toward the position illustrated in Figure 1. At the same time, air will flow through the conduit 74 and nipple 56 into the air chamber 7, the lubricant being arranged to flow into and fill the chamber 6 before pressure is built up in the air chamber 7 equal to that at which the lubricant is supplied. Thereafter, air flowing into the nipple 56 will operate the air booster as described above to build up a large pressure in the air chamber 7. When the dispenser is fully charged with both lubricant and air, it may be removed from the charging device and carried to any desired point of use.

While only one embodiment of the invention has been illustrated and described in detail, it will be understood that many changes might be made therein and that various other embodiments might be devised such, for example, as portable power devices for operating tools other than lubricant dispensers, for inflating tires and the like. It is accordingly not intended that the scope of the invention shall be limited to the form shown or otherwise than by the terms of the appended claims.

I claim:

1. A unitary portable lubricating device comprising, a fluid-operated pump, a storage chamber for fluid under pressure, means to conduct fluid from said storage chamber to said pump to operate the pump, means to conduct fluid under pressure to the chamber and a booster pump to receive fluid from said conducting means and discharge it into said chamber under increased pressure said chamber, said pumps and said conducting means forming a portable self-contained unit.

2. A device of the class described comprising a portable fluid storage chamber, a valved inlet nipple for supplying fluid under pressure to the storage chamber, and a booster pump portable with said chamber and having an automatic valve connected to the nipple to control operation of the booster pump, said booster pump having a fluid inlet connected to the inlet nipple to receive fluid therefrom and an outlet connected to the storage chamber.

3. A lubricating device comprising, a fluid-operated lubricant pump, a reservoir, a piston dividing said reservoir into a lubricant chamber and an air storage chamber, a valve controlling communication of the air chamber with the pump to control operation of the pump, a booster pump connected to the reservoir and communicating with the air chamber to supply air under pressure thereto, and means to supply air under pressure to the booster pump to operate it.

4. In combination, a lubricating device having a lubricant reservoir, an air reservoir, and valved fittings at opposite ends of the device communicating with said reservoirs respectively, a charging device including longitudinally-spaced lubricant and air nozzles adapted to engage said fittings respectively, and means for moving said nozzles relatively toward each other for simultaneously engaging said fittings.

5. In combination, a lubricating device having a lubricant reservoir, an air reservoir, and valved fittings at opposite ends of the device communicating with said reservoirs respectively, a charging device including a nozzle mounted on a fixed part and adapted to engage one of said fittings, a pivoted lever, and a nozzle mounted on said lever to be swung toward and away from said first-named nozzle and to engage the other of said fittings whereby said nozzles may engage the fittings simultaneously.

6. In combination, a lubricating device having a lubricant reservoir, an air reservoir, and valved fittings at opposite ends of the device communicating with said reservoirs respectively, a charging device including a nozzle mounted on a fixed part and adapted to engage one of said fittings, a pivoted lever, and a nozzle mounted on said lever to be swung toward and away from said first-named nozzle and to engage the other of said fittings whereby said nozzles may engage the fittings simultaneously, one of said nozzles and the cooperating fitting being formed with complementary spherical surfaces to be capable of relatively universal movement.

7. In combination, a lubricating device having a lubricant reservoir, an air reservoir, and valved fittings at opposite ends of the device communicating with said reservoirs respectively, a charging device including a nozzle mounted on a fixed part and adapted to engage one of said fittings, a pivoted lever, and a nozzle mounted on said lever to be swung toward and away from said first-named nozzle and to engage the other of said fittings whereby said nozzles may engage the fittings simultaneously, said last-named nozzle and its cooperating fitting being formed with complementary spherical surfaces to be capable of relatively universal movement.

8. In combination, a lubricating device having a lubricant reservoir, an air reservoir, a valved fitting at one end of the device communicating with the air reservoir, and a valved, spherical-headed fitting at the opposite end of the device communicating with the lubricant reservoir, a charging device including a base, a nozzle fixedly mounted at one end of the base and engageable with said first-named fitting, a lever pivoted at the other end of the base, and a nozzle mounted on said lever and having a spherical surface to engage the spherical head of said last-named fitting for relatively universal movement.

9. A charging device for lubricant dispensers comprising, a base, a nozzle rigidly connected to one end of said base, a lever pivoted at the opposite end of the base, and a nozzle carried by said lever, one of said nozzles being connected to a source of lubricant under pressure and the other being connected to a source of air under pressure.

10. A portable power device comprising a portable fluid reservoir adapted to store a supply of fluid under pressure, means for conducting fluid under pressure to the reservoir, and a booster pump connected to said means and to the reservoir and portable with the reservoir for increasing the pressure of the fluid supplied to the reservoir by said means.

ADIEL Y. DODGE.